US006541878B1

(12) United States Patent
Diab

(10) Patent No.: US 6,541,878 B1
(45) Date of Patent: Apr. 1, 2003

(54) INTEGRATED RJ-45 MAGNETICS WITH PHANTOM POWER PROVISION

(75) Inventor: Wael W. Diab, Menlo Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 09/618,976

(22) Filed: Jul. 19, 2000

(51) Int. Cl.$^{7}$ .................................................. H02J 3/00
(52) U.S. Cl. .......................... 307/17; 307/412; 439/490
(58) Field of Search .................... 307/17, 412; 439/490

(56) References Cited

U.S. PATENT DOCUMENTS

| | | | | |
|---|---|---|---|---|
| 4,835,737 | A | 5/1989 | Herrig et al. | 364/900 |
| 5,122,691 | A | 6/1992 | Balakrishnan | 307/475 |
| 5,268,592 | A | 12/1993 | Bellamy et al. | 307/43 |
| 5,386,567 | A | 1/1995 | Lien et al. | 395/700 |
| 5,491,804 | A | 2/1996 | Heath et al. | 395/275 |
| 5,531,612 | A | 7/1996 | Goodall et al. | 439/541.5 |
| 5,613,130 | A | 3/1997 | Teng et al. | 395/750 |
| 5,639,267 | A | 6/1997 | Loudermilk | 439/701 |
| 5,726,506 | A | 3/1998 | Wood | 307/147 |
| 5,758,102 | A | 5/1998 | Carey et al. | 395/283 |
| 5,775,946 | A | 7/1998 | Briones | 439/607 |
| 5,790,873 | A | 8/1998 | Popper et al. | 395/50.01 |
| 5,793,987 | A | 8/1998 | Quackenbush et al. | 395/280 |
| 5,796,185 | A | 8/1998 | Takata et al. | 307/140 |
| 5,809,256 | A | 9/1998 | Najemy | 395/283 |
| 5,834,925 | A | 11/1998 | Chesavage | 323/272 |
| 5,884,233 | A | 3/1999 | Brown | 702/61 |
| 5,994,998 | A | 11/1999 | Fisher et al. | 340/310.01 |
| 6,033,266 | A | 3/2000 | Long | 439/676 |
| 6,036,547 | A | 3/2000 | Belopolsky et al. | 439/626 |
| 6,059,581 | A | 5/2000 | Wu | 439/79 |
| 6,068,520 | A | 5/2000 | Winings et al. | 439/676 |
| 6,099,349 | A | 8/2000 | Boutros | 439/541.5 |
| 6,115,468 | A | 9/2000 | De Nicolo | 379/413 |
| 6,134,666 | A | 10/2000 | De Nicolo | 713/300 |
| 6,162,089 | A | 12/2000 | Costello et al. | 439/541.5 |
| 6,310,781 | B1 * | 10/2001 | Karam | 361/764 |

* cited by examiner

*Primary Examiner*—Brian Sircus
*Assistant Examiner*—Robert L Deberadinis
(74) *Attorney, Agent, or Firm*—Thelen Reid & Priest LLP; David B. Ritchie

(57) ABSTRACT

A connector integrates a transformer and a "phantom" power provision, thus enabling a reduction in size along with an increase in versatility for electronic communication. The transformer may comprise a pair of magnetic transformers. The power source may be connected to center taps of the magnetic transformers for providing a bias voltage to the connector.

42 Claims, 8 Drawing Sheets

INTEGRATED RJ-45 MAGNETICS WITH PHANTOM POWER PROVISION

FIELD OF THE INVENTION

The present invention relates to an apparatus for supplying magnetic transformers and "phantom" power to a multipin connector.

BACKGROUND OF THE INVENTION

As processing platforms (including personal computers and network devices) develop greater capability, the industry seeks to reduce the area needed by various components. Such platforms may be represented by a printed circuit board (PCB) and its linked components used for a personal computer, network switch, router, etc. The electrical circuitry for communicating with the platform may be implemented using a transceiver, a transformer (with associated resistors and capacitors) and a connector. Communication may be conducted through a protocol, such as the Institute for Electrical and Electronics Engineers (IEEE) standard 802.3 known as Ethernet™.

The transceiver, also known as "PHY" or Φ (for physical layer), may combine digital adaptive equalizers, phase-lock loops, line drivers, encoders, decoders and other related components. A magnetic transformer may be used to transfer electrical energy from electrically isolated circuits by magnetic fields and fluxes through its windings. The RJ-45 connector, specified under the Telecommunications Industry Association, has eight input pins to the PCB and eight output pins to a jack, with each input pin directly associated with its corresponding output pin. The jack provides a standard receiving port for twisted pair wires connected by a plug to a cable used in 10 BaseT or 100 BaseT Ethernet under IEEE 802.3X.

One method by which required board area on a PHY may be decreased involves component consolidation. The PHY handles the media access control protocols for computer interface communications. The aft region of the PCB, where a RJ-45 cable plug may be inserted into the connector, typically includes magnetic transformers for transferring electronic signals from the PHY to the connector without electrical conduction. The power conduit may also be in proximity to the connector. Typically, the magnetic transformers and power sources are shielded or separated by distance from the connector to minimize noise and electromagnetic interference (EMI).

FIG. 1 shows a schematic for a first conventional eight-pin implementation with discrete magnetics for data-exchange. A connector 10 may be coupled to a PHY 12 through a series of pins by a pair of magnetic transformers 14. The transformers 14 may be separated from the PHY 12 and the connector 10 by boundaries 16*a* and 16*b*. The PHY 12 may have a pair of receiver ports identified as Rx+ and Rx− along with a complimentary pair of transmitter ports identified as Tx+ and Tx−.

The transformers 14 may be represented by a first 1:1 winding pair 18*a* and a second 1:1 winding pair 18*b*. The windings represent a fine wire wrapped around a core for transmitting power through magnetic fields rather than by electrical conduction. The 1:1 ratio provides voltage out to equal voltage in. Each side of winding pairs may include a center tap. On the PHY or chip input side, the first and second winding pairs 18*a* and 18*b* show first and second taps 20*a* and 20*b*, respectively. On the cable output side, the first and second winding pairs 18*a* and 18*b* show third and fourth taps 20*c* and 20*d*, respectively. A center tap provides the bias voltage from the tapped side of the transformer, with an absolute value typically set to a value above ground as specified by the PHY 12. For example, if a direct current power source is applied at a center transmitter tap, the transmitter ports Tx+ and Tx− represent differential signals of opposite polarity fluctuating about the bias voltage. The transmitter ports provide the fluctuating voltage difference signal to be transmitted, while the center tap indicates the bias voltage value.

The PHY 12 may include a parallel circuit to the transformers 14 across the receiver ports Rx+ and Rx−. The receiver parallel circuit may include a first pair of 50· resistors 22*a* and 22*b*, with a 1 nf capacitor 24*a* in between and terminating at a fixed potential such as ground 26. (The capacitor 24*a* may withstand a 50 v surge.) The PHY 12 may also include a parallel circuit to the transformers 14 across the transmitter ports Tx+ and Tx−. The transmitter termination circuit may include a second pair of 50Ω resistors 22*c* and 22*d*, with a 3.3 v voltage source 28 in between and connected to the second center tap 20*b* for the second winding pair 18*b*.

On the cable side of the transformer 14, the fourth center tap 20*d* for the second winding pair 18*b* may be connected to a resonator or termination triplet of 75Ω resistors 30*a*, 30*b* and 30*c*. The first two resistors may be associated with the connector 10. The third resistor 30*c* may be connected to a 1 nf high potential capacitor 32 that in turn may be connected to ground 26. (The high potential capacitor 32 may withstand a 2 kv surge.)

The connector 10 may include a series of pins. The RJ-45 connector includes an eight-pin configuration for input coupled to an output port 34. These may be identified as 36*a* for pin one, 36*b* for pin two, 36*c* for pin three, 36*d* for pin four, 36*e* for pin five, 36*f* for pin six, 36*g* for pin seven and 36*h* for pin eight. The first and second pins 36*a* and 36*b* may be paired to the cable side of the first winding pair 18*a*, thus serving as receiver connections Rx+ and Rx−, respectively. Alternatively, an inductor choke (not shown), used for noise suppression, may serve as a connection between the winding pair 18*a* and the pins 36*a* and 36*b*. The third and sixth pins 36*c* and 36*f* may be paired to the cable side of the second winding pair 18*b*, thus serving as transmitter connections. Tx+ and Tx−, respectively. The fourth and fifth pins 36*d* and 36*e* may be shorted together at line 38*a* and paired to resistor 30*a* connected to the high potential capacitor 32. The seventh and eighth pins 36*g* and 36*h* may be shorted together at line 38*b* and paired to resistor 30*b*.

Thus, pins 36*a* and 36*b* represent a receiver pair and pins 36*c* and 36*f* represent a transmitter pair. In this conventional configuration, only four of the eight pins 36*a*, 36*b*, 36*c* and 36*f* are employed for connections. The other four pins 36*d*, 36*e*, 36*g* and 36*h* remain unused. Connector input and output pins are thereby arranged as follows:

| pin no. | connection |
|---|---|
| 1 | Rx+ |
| 2 | Rx− |
| 3 | Tx+ |
| 4 | unused |
| 5 | unused |
| 6 | Tx− |
| 7 | unused |
| 8 | unused |

The absence of an electrical power supply to the cable side center taps prevents the connector from serving a "telephone" connection or other such power requiring device, in which the power is supplied through the connection. Such a connection may include Ethernet data exchange, voice communication (with internet protocol), a power-consumption device that mimics Ethernet protocol, and measurement sensors.

Such a power source may be transferred by an in-line or "phantom" power source to the transformers at the center taps on the cable side. The term "phantom" refers to using existing wire pairs in Ethernet without additional wire or connector pin overhead. One of the signal pairs on the transformer 18*b* on the cable side may be biased at the direct current (DC) power voltage of the telephone. The other set of signal pairs may be biased at the DC return of the power voltage on the cable side. Since a telephone receiver on the cable side also has transformers for the Ethernet Rx± and Tx± pairs, the DC power from the pairs may supply power to the telephone using magnetic fields and fluxes. For the Tx± and Rx± pairs, the DC component for the bias may be considered "common mode" relative to the differential signals.

FIG. 2A shows a typical pin layout between the connector and the PCB. The pins or corresponding apertures are arranged as shown in locations 36*a* through 36*h*. A ground connection 26 may be disposed in an adjacent position. FIG. 2B shows a side block diagram of the components on a PCB 40. The PHY 12, transformer 14 and connector 10 may be separated by discrete distances and connected through metal conduits in the PCB 40. The connector 10 has an aperture jack 42 through which a plug 44, connected to a twisted wire-pair cable 46, may be inserted for communicating to another device.

FIG. 3 shows a schematic for a second conventional eight-pin implementation with discrete "phantom" or in-line power coupled with discrete magnetics. A connector 50 may be coupled to a PHY 52 through a series of pins by a pair of transformers 54. The transformers 54 may be separated from the PHY 52 and the connector 50 by boundaries 56*a* and 56*b*. The PHY 52 may have a pair of receiver ports Rx+ and Rx− along with a complimentary pair of transmitter ports Tx+ and Tx−. The pair of transformers 54 may include center taps 20*a*, 20*b*, 20*c* and 20*d*.

A $V_{dd}$ power supply of 48v, not associated with the connector 50, may be represented by a hot lead 62*a* and a return lead 62*b*. The "phantom" power represents the electrical power transfer from the lead source 62*a* and 62*b* to the connector 50. The hot lead 62*a* may be connected to the third center tap 20*c* and to a 1 nf capacitor 24*b* and 75Ω resistor 30*d* in series, connecting to the high potential capacitor 32 held to ground 26. The return lead 62*b* may be connected in parallel to the fourth center tap 20*d* and to a 1 nf capacitor 24*c* and 75Ω resistor 30*e* in series, connecting to the high potential capacitor 32 held to ground 26. The resistors 30*d* and 30*e* may be connected to a line having a high potential capacitor 32 held to ground 26 and to a parallel pair of 75Ω resistances 30*a* and 30*b*.

The RJ-45 connector may include an eight-pin configuration for input coupled to an output port 64. The eight-pin configuration for connector 50 may be identified as 66*a* for pin one, 66*b* for pin two, 66*c* for pin three, 66*d* for pin four, 66*e* for pin five, 66*f* for pin six, 66*g* for pin seven and 66*h* for pin eight. The first and second pins 66*a* and 66*b* may be paired to the cable side of the first winding pair 18*a*, thus serving as receiver connections. The third and sixth pins 66*c* and 66*f* may be paired to the cable side of the second winding pair 18*b*, thus serving as transmitter connections. The fourth and fifth pins 66*d* and 66*e* may be shorted together by line 68*a* connected to resistor 30*a*. The seventh and eighth pins 66*g* and 66*h* may be shorted together by line 68*b* connected to resistor 30*b*. The unused pairs may be terminated with 75Ω resistors and connected to the high potential capacitor 32 for surge protection. Again, only four of the eight pins 66*a*, 66*b*, 66*c* and 66*f* are employed for connections. The other four pins 66*d*, 66*e*, 66*g* and 66*h* remain unused.

A connector 10 or 50 may have a length of 0.894 inch from the PCB's aft periphery to the fore end into the PCB 40. The discrete magnetics 12 or 52 are typically disposed an inch or more from the connector fore end as a compromise between manufacturability and magnetic isolation. A PCB 40 using discrete magnetics 12 may have the PHY interface located 1.954 inches from the connector fore edge. This region along the connector 10 represents a significant area of underutilization. Integrating the magnetics 12 into the connector 10 may reduce this PCB area consumed for magnetic shielding. The addition of "phantom" power increases this distance slightly to 1.996 inches.

FIG. 4 shows a schematic for an eight-pin implementation with embedded magnetics in a data-exchange circuit. A connector 70 may be coupled to a PHY 72 through a series of pins by a pair of transformers 74. In the integrated magnetics module (IMM), the transformers 74 may be embedded in the connector 70 to reduce area on a PCB 40 and/or to reduce manufacturing, inventory and installation costs.

The transformers 74 may be separated from the PHY 72 and the connector 70 by boundary 76. The PHY 72 may have a pair of receiver ports Rx+ and Rx−, along with a complimentary pair of transmitter ports Tx+ and Tx−. The fourth center tap 20*d* for the second winding 18*b* may be connected to a 75Ω resistor 30*f* that may be connected in parallel to a pair of 75Ω resistors 30*g* and 30*h* and a high potential 1 nf capacitor 32 held to ground 26.

The RJ-45 connector includes an eight-pin configuration for input coupled to an output port 84. The eight-pin configuration for connector 80 may be identified as 86*a* for pin one, 86*b* for pin two, 86*c* for pin three, 86*d* for pin four, 86*e* for pin five, 86*f* for pin six, 86*g* for pin seven and 86*h* for pin eight. The first and third pins 78*a* and 78*c* may be paired to the PHY side of the first winding pair 18*a*, thus serving as receiver connections. The second pin 86*b* may be connected to the first center tap 20*a* on the PHY side of the first winding pair 18*a*. The fourth and sixth pins 86*d* and 86*f* may be paired to the PHY side of the second winding pair 18*b*, thus serving as transmitter connections. The fifth pin 86*e* may be connected to the second center tap 20*b* on the PHY side of the second winding pair 18*b*. The seventh pin 86*g* may be unused. The eighth pin 86*h* may be connected between the high potential capacitor 32 and ground 26. Unlike the discrete magnetics configurations, the PHY-to-connector interface pins for input and cable jack pins for output may not-be directly correlate in a connector with embedded magnetic transformers.

The embedding of the magnetic transformers into the connector enables the PHY 72 to be disposed from the fore edge of the magnetic integrated connector at 0.985 inch. By combining the transformer 74 and connector 70 (without "phantom" power), the depth is reduced by 0.969 inch, permitting either a smaller physical PCB or increased area for component installation, as well as reduced cost. However, such an implementation does not enable power to be transferred to the conductor. Consolidation of the integrated magnetics and "phantom" power to the connector remains an unfulfilled need in the industry.

SUMMARY OF THE INVENTION

A connector integrates a transformer and a "phantom" power provision, thus enabling a reduction in size along with an increase in versatility for electronic communication. The transformer may comprise a pair of magnetic windings. The power source may be connected to center taps of the magnetic transformers for providing a bias voltage to the connector.

The embedding of the magnetic transformers into the connector enables the PHY 72 to be disposed from the fore edge of the magnetic integrated connector at 0.985 inch. By combining the transformer 74 and connector 70 (without "phantom" power), the depth is reduced by 0.969 inch, permitting either a smaller physical PCB or increased area for component installation, as well as reduced cost. However, such an implementation does not enable power to be transferred to the connector. Consolidation of the integrated magnetics and "phantom" power to the connector remains an unfulfilled need in the industry.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons having the benefit of the within disclosure.

Figure 1:
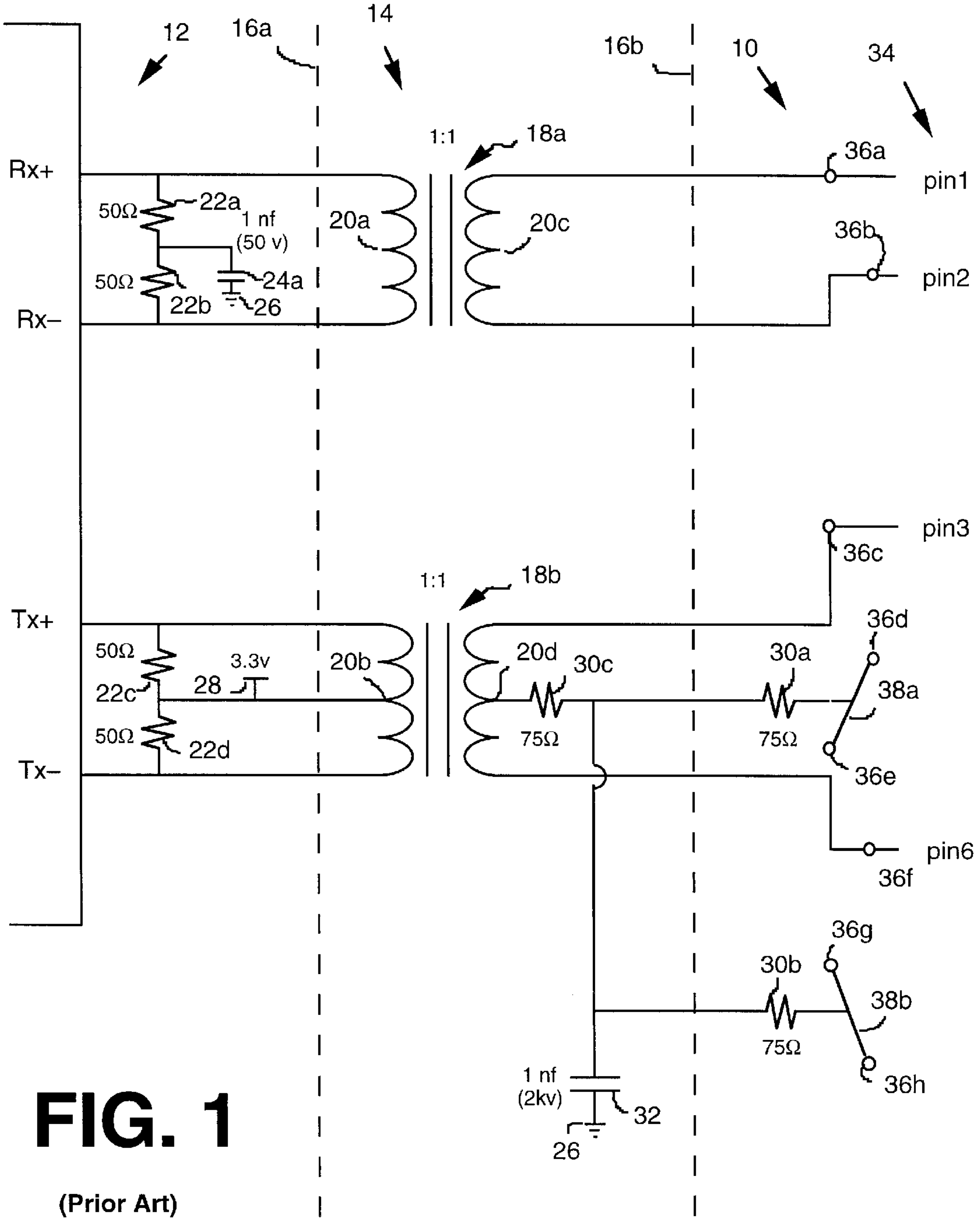
FIG. 1 (Prior Art)
FIG. 1 is a schematic diagram of a discrete magnetics connector configuration according to the prior art.
Figure 2A:
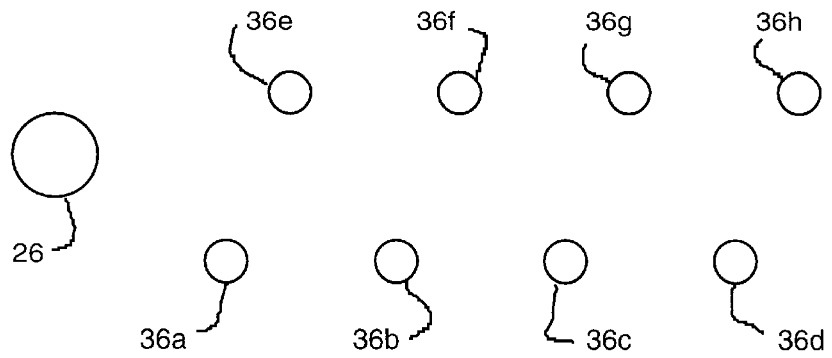
FIG. 2A (Prior Art)
FIG. 2A is a schematic diagram of the pin arrangement of a RJ-45 connector according to the prior art.
Figure 2B:
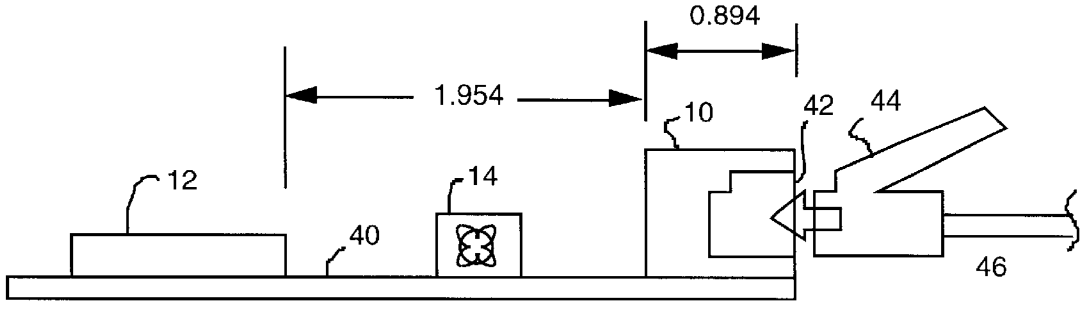
FIG. 2B (Prior Art)
FIG. 2B is a block diagram of the components on a PCB according to the prior art.
Figure 3:
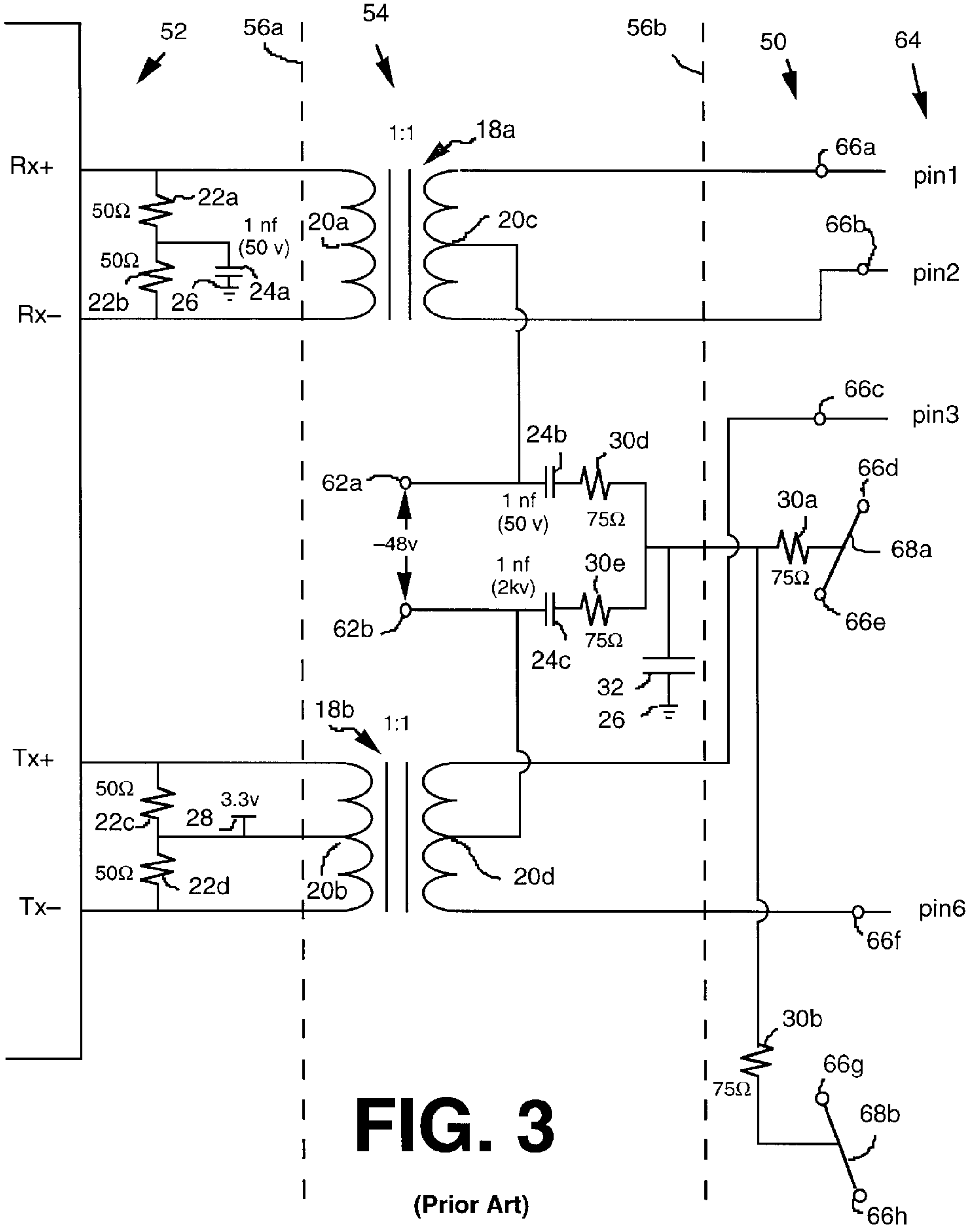
FIG. 3 (Prior Art)
FIG. 3 is a schematic diagram of a discrete magnetics connector configuration with "phantom" power according to the prior art.

The present invention relates to an apparatus and method to integrate in-line or "phantom" power and magnetic transformers to a multi-pin electrical connector. This invention enables the reduction of area on a computer board for installing a connector. Such a development may reduce PCB depth consumed for this application (enabling either smaller boards or more components to be incorporated). The discrete "phantom" power using discrete magnetics (FIG. 3) consumes more PCB depth than that consumed by a data-only discrete magnetics circuit (FIG. 1). The data-only IMM (FIG. 4) reduces the consumed area on the PCB by incorporating the magnetics in the chassis of the connector. The integration of "phantom" power with the IMM combines PCB area savings, while providing "telephone" functionality using Ethernet connections.

In addition, such an invention facilitates reduced per unit cost of each of these items (since only a single vendor supplies the formerly three separate components) as well as reduced assembly effort and inventory infrastructure. The incorporation of "phantom" power increases versatility by enabling "telephone" communication that requires electrical power through the connector to be delivered between communication lines and reduces PCB complexity.

Figure 5:
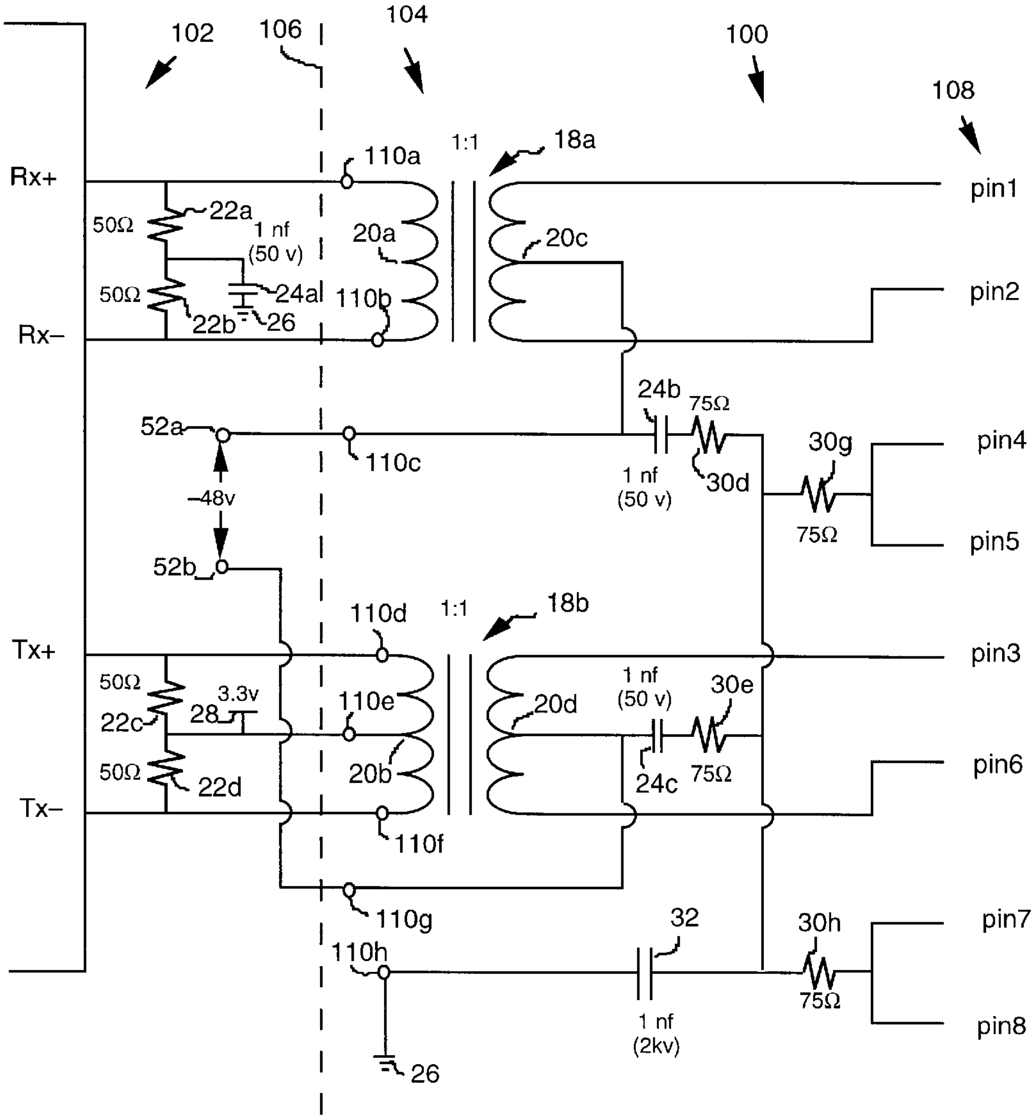
FIG. 5 is a schematic diagram of an 8-pin connector configuration in accordance with a specific embodiment of the present invention.

FIG. 5 shows a schematic for a first eight-pin implementation with integrated magnetics and "phantom" power interface. A connector 100 may be coupled to a PHY 102 through a series of pins. A pair of transformers 104 may be used to transfer electrical energy from one circuit to another circuit by magnetic fields and fluxes. Across the boundary 106, the PHY 102 has a pair of receiver ports Rx+ and Rx− along with a complimentary pair of transmitter ports Tx+ and Tx−.In accordance with the present invention, the connector 100 integrates the transformers 104 which are represented by a first 1:1 winding pair 18*a* and a second 1:1 winding pair 18*b*.

The transformers 104 may be represented by a first 1:1 winding pair 18*a* and a second 1:1 winding pair 18*b*. Each side of winding pairs may include a center tap. On the PHY side, the first and second winding pairs 18*a* and 18*b* show first and second taps 20*a* and 20*b*, respectively. On the cable side, the first and second winding pairs 18*a* and 18*b* show third and fourth taps 20*c* and 20*d*, respectively.

The PHY 102 may include a parallel circuit to the transformers 104 across the receiver ports Rx+ and Rx−. The receiver parallel circuit may include a first pair of 50Ω resistors 22*a* and 22*b*, with a 1 nf capacitor 24*a* in between and terminating at ground potential 26. The PHY 102 may also include a parallel circuit to the transformers 104 across the transmitter ports Tx+ and Tx−. The transmitter parallel circuit may include a second pair of 50Ω resistors 22*c* and 22*d*, with a 3.3 v voltage source 28 in between and connected to the second center tap 20*b* for the second winding pair 18*b*.

A $V_{dd}$ power supply of 48 v, not associated with the connector 100, may be represented by a hot lead 52*a* and a return lead 52*b*. The "phantom" power represents the electrical power transfer from the lead source 52*a* and 52*b* to the connector 100. The hot lead 52*a* may be connected in parallel to the third center tap 20*c* and to a 1 nf capacitor 24*b* and 75Ω resistor 30*d* in series. The return lead 52*b* may be connected in parallel to the fourth center tap 20*d* and to a 1 nf capacitor 24*c* and 75Ω resistor 30*e* in series. The resistors 30*d* and 30*e* may be connected to a line having a high potential capacitor 32 held to ground 26 and to a parallel pair of 75Ω resistances 30*a* and 30*b*. Thus, electrical power may be supplied to the center taps 20*c* and 20*d* without the need of an independent power source for the connector 100.

The RJ-45 output port 108 for receiving a cabled plug may include eight output pins. The first and second output pins may be connected to the cable side of the first winding pair 18*a*, thus serving as receiver connections. The third and sixth output pins may be connected to the cable side of the second winding pair 18*b*, thus serving as transmitter connections. The fourth and fifth output pins may be connected to resistor 30*g*, and the seventh and eighth output pins may be connected to resistor 30*h*.

The connector 100 may include a series of eight input pins. These are identified as 110*a* for the first input pin, 110*b* for the second input pin, 110*c* for the third input pin, 110*d* for the fourth input pin, 110*e* for the fifth input pin, 110*f* for the sixth pin, 110*g* for the seventh input pin and 110*h* for the eighth input pin. The first and second input pins 110*a* and 110*b* may be connected to the PHY side of the first winding pair 18*a*, thus serving as receiver connections, complimenting the first and second output pins. The third input pin 110*c* may be connected to hot lead 52*a*. The fourth and sixth input pins 110*d* and 110*f* may be connected to the PHY side of the second winding pair 18*b*, thus serving as transmitter connections, complimenting the third and sixth output pins.

The fifth input pin 110*e* may be connected between the voltage source 28 and the second center tap 20*b* on the PHY side of the second winding pair 18*b*. The seventh input pin 110*g* may be connected to the return lead 52*b* and the fourth center tap 20*d* on the cable side of the second winding 18*b*. The eighth input pin 110*h* may be connected between the high potential capacitor 32 and ground 26. The input pins for the first eight-present invention are arranged as follows:

| input (PHY) pin no. | output (cable) pin | connection |
|---|---|---|
| 1 | 1 | Rx + in |
| 2 | 2 | Rx − in |
| 3 | | Rx center out tap |
| 4 | 3 | Tx + in |
| 5 | | Tx center in tap |
| 6 | 6 | Tx − in |
| 7 | | Tx center out tap |
| 8 | | ground |

The first eight-pin integrated magnetics configuration of the present invention, through the arrangement of auxiliary resistors and capacitors, enables the integration of receiver and transmitter transformers and a power conduit to the center out taps. The connector input pins may thereby have access to both center out taps, the transmitter center in tap and ground for the previously unused pins.

Figure 6:
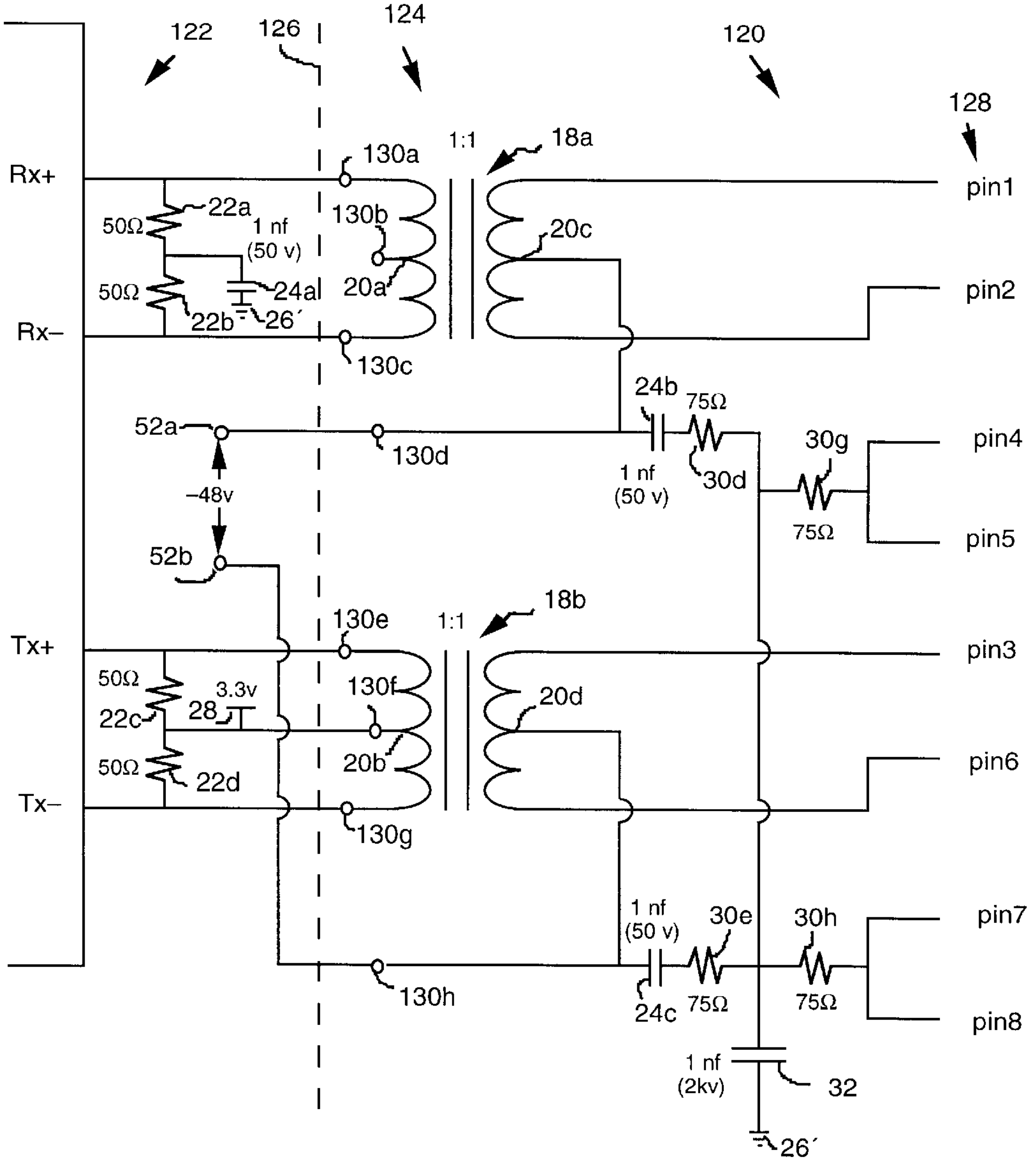
FIG. 6 is a schematic diagram of an 8-pin connector configuration with shield grounding in accordance with a specific embodiment of the present invention.

FIG. 6 shows a schematic for a second eight-pin implementation with integrated magnetics and "phantom" power interface. A connector 120 may be coupled to a PHY 122 through a series of pins. A pair of transformers 124 may be used to transfer electrical energy from one circuit to another circuit by magnetic fields and fluxes. Across the boundary 126, the PHY 122 has a pair of receiver ports Rx+ and Rx− along with a complimentary pair of transmitter ports Tx+ and Tx−.

In accordance with the present invention, the connector 120 integrates the transformers 124 which are represented by a first 1:1 winding pair 18*a* and a second 1:1 winding pair 18*b*. Each side of winding pairs may include a center tap, 20*a*, 20*b*, 20*c* and 20*d*. The receiver parallel circuit between Rx+ and Rx− may include similar features shown in FIG. 5 and terminating at shield ground 26'. A−48v power supply, not associated with the connector 120, may be represented by a hot lead 52*a* and a return lead 52*b*.

Figure 4:
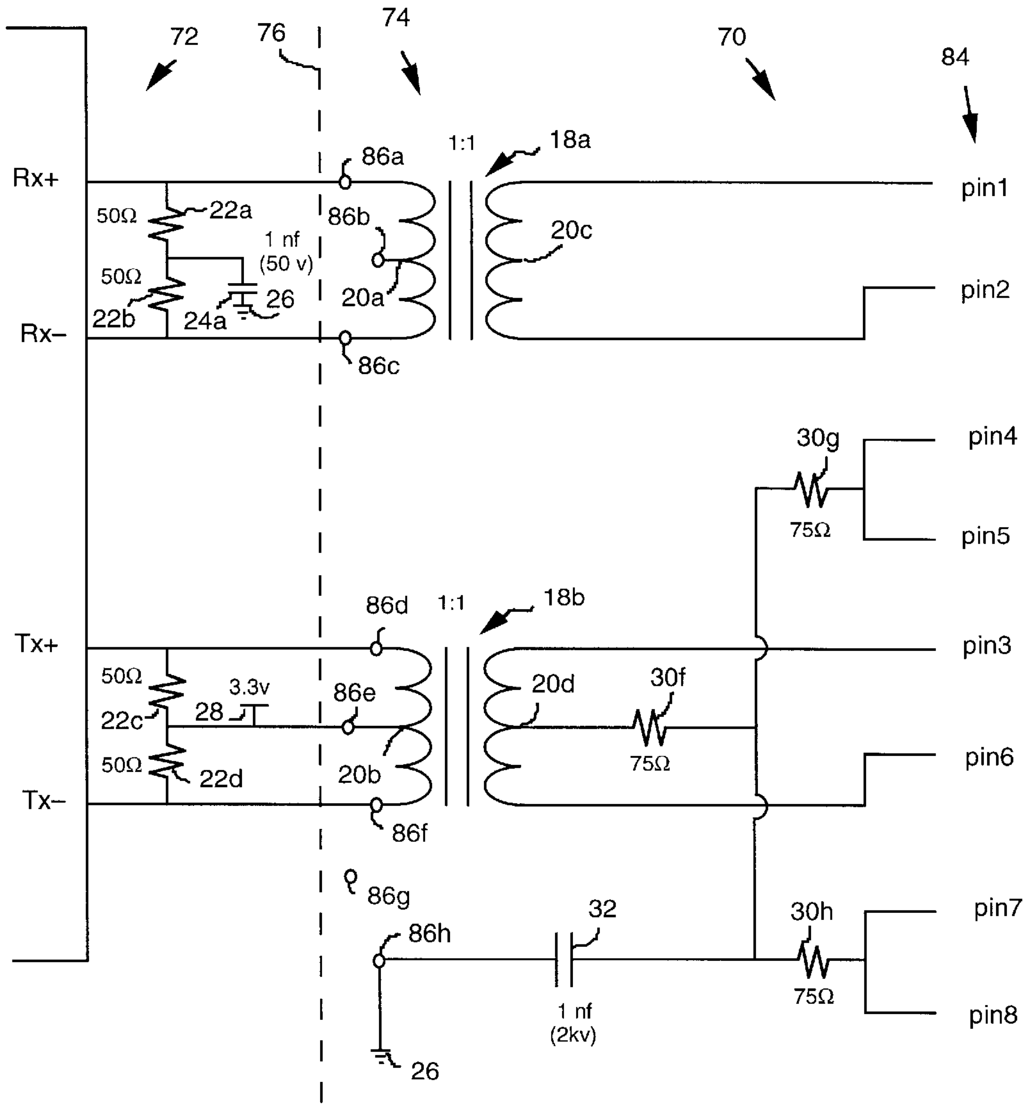
FIG. 4 (Prior Art)
FIG. 4 is a schematic diagram of an integrated magnetics connector configuration is according to the prior art.

The RJ-45 output port 128 may include in a similar configuration to FIG. 4 a series of eight output pins. The connector 120 may include a series of eight input pins. These may be identified as 130*a* for the first input pin, 130*b* for the second input pin, 130*c* for the third input pin, 130*d* for the fourth input pin, 130*e* for the fifth input pin, 130*f* for the sixth pin, 130*g* for the seventh input pin and 130*h* for the eighth input pin.

The first and third input pins 130*a* and 130*c* may be connected to the PHY side of the first winding pair 18*a*, thus serving as receiver connections, complimenting the first and second output pins. The second input pin 130*b* may be connected to the first center tap 20*a* on the PHY side of the first winding pair 18*a*. The fourth input pin 130*d* may be connected to hot lead 52*a*. The fifth and seventh input pins 130*e* and 130*g* may be connected to the PHY side of the second winding pair 18*b*, thus serving as transmitter connections, complimenting the third and sixth output pins. The sixth input pin 130*f* may be connected between the voltage source 28 and the second center tap 20*b* on the PHY side of the second winding pair 18*b*. The eighth input pin 130*h* may be connected to the return lead 52*b* and the fourth center tap 20*d* on the cable side of the second winding 18*b*. In the absence of a pin-connection to ground, the shield or metal chassis of the connector 120 may serve as the shield ground 26'. The input pins for the second eight-pin embodiment of the present invention are arranged as follows:

| input pin no. | output pin | connection |
|---|---|---|
| 1 | 1 | Rx + in |
| 2 | | Rx center in tap |
| 3 | 2 | Rx − in |
| 4 | | Rx center out tap |
| 5 | 3 | Tx + in |
| 6 | | Tx center in tap |
| 7 | 6 | Tx − in |
| 8 | | Tx center out tap |

The second eight-pin integrated magnetics configuration of the present invention, through the arrangement of auxiliary resistors and capacitors, enables the integration of receiver and transmitter transformers and a power supply to the center out taps. The connector input pins may thereby have access to both center out taps and both center in taps for the previously unused pins. The metal chassis or shield for mechanical, environmental and electrical protection of the connector 120 may be connected to the PCB ground plane to serve as connector ground 26', particularly for the high potential capacitor 32 in EMI suppression. Grounds on the PCB may be tied together by a system ground connector or plane.

Figure 7:
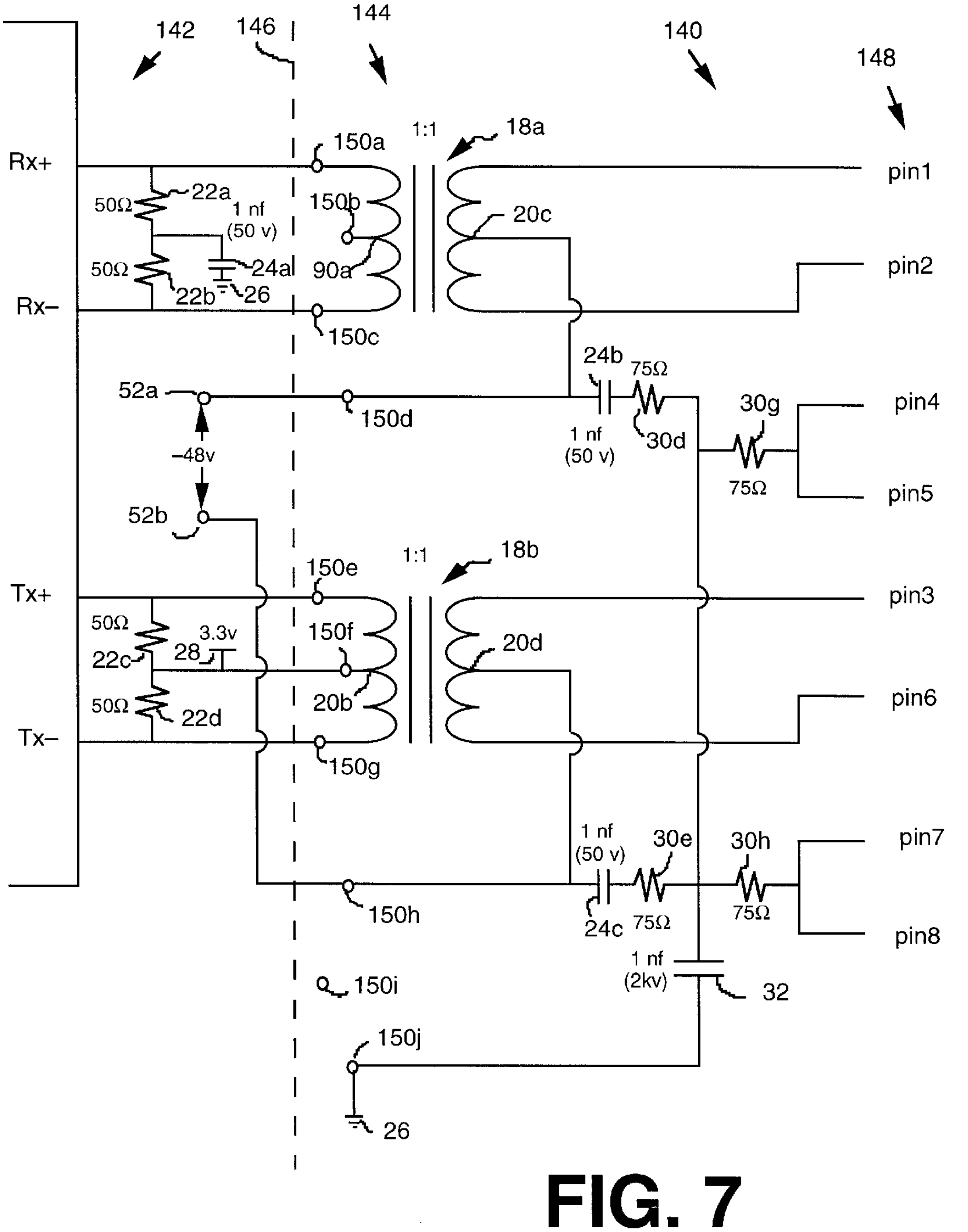
FIG. 7 is a schematic diagram of a 10-pin connector configuration in accordance with a specific embodiment of the present invention.

FIG. 7 shows a schematic for a ten-pin implementation with integrated magnetics and "phantom" power interface. A connector 140 may be coupled to a PHY 102 through a series of pins. A pair of transformers 144 may be used to transfer electrical energy from one circuit to another circuit without electrical conduction. Across the boundary 146, the PHY 142 has a pair of receiver ports Rx+ and Rx− along with a complimentary pair of transmitter ports Tx+ and Tx−.

In accordance with the present invention, the connector 140 integrates the transformers 144 represented by a first 1:1 winding pair 18*a* and a second 1:1 winding pair 18*b*. Each side of winding pairs may include a center tap, 20*a*, 20*b*, 20*c* and 20*d*. A $V_{dd}$ power supply of −48 v, not associated with the connector 140, may be represented by a hot lead 52*a* and a return lead 52*b*.

The RJ-45 output port 148 may include eight output pins. The first and second output pins may be connected to the cable side of the first winding pair 18*a*, thus serving as receiver connections. The third and sixth output pins may be connected to the cable side of the second winding pair 18*b*, thus serving as transmitter connections. The fourth and fifth output pins may be connected to resistor 30*g*, and the seventh and eighth output pins may be connected to resistor 30*h*.

The connector 140 may include a series of ten input pins. These may be identified as 150*a* for the first input pin, 150*b* for the second input pin, 150*c* for the third input pin, 150*d* for the fourth input pin, 150*e* for the fifth input pin, 150*f* for the sixth pin, 150*g* for the seventh input pin, 150*h* for the eighth input pin, 150*i* for the ninth input pin and 150*j* for the tenth input pin.

The first and third input pins 150*a* and 150*c* may be connected to the PHY side of the first winding pair 18*a*, thus serving as receiver connections, complimenting the first and second output pins. The second input pin 150*b* may be connected to the first center tap 20*a* on the PHY side of the first winding pair 18*a*. The fourth input pin 150*d* may be connected to hot lead 52*a*. The fifth and seventh input pins 150*e* and 150*g* may be connected to the PHY side of the second winding pair 18*b*, thus serving as transmitter connections, complimenting the third and sixth output pins.

The sixth input pin 150*f* may be connected between the voltage source 28 and the second center tap 20*b* on the PHY side of the second winding pair 18*b*. The eighth input pin 150*h* may be connected to the return lead 52*b* and the fourth center tap 20*d* on the cable side of the second winding 18*b*. The ninth input pin 150*i* may be unused. The tenth input pin 150*j* may be connected between the high potential capacitor 32 and ground 26.

Using a ten-pin configuration, the center taps 20*a*, 20*b*, 20*c* and 20*d* for both sides of both the receiver and transmitter windings 18*a* and 18*b* along with ground 26 may be transmitted to the connector. The input pins for the ten-pin embodiment of the present invention are arranged as follows:

| input pin no. | output pin | connection |
|---|---|---|
| 1 | 1 | Rx + in |
| 2 | | Rx center in tap |
| 3 | 2 | Rx − in |
| 4 | | Rx center out tap |
| 5 | 3 | Tx + in |
| 6 | | Tx center in tap |
| 7 | 6 | Tx − in |
| 8 | | Tx center out tap |
| 9 | | unused |
| 10 | | ground |

Through the arrangement of auxiliary resistors and capacitors, this ten-pin embodiment of the present invention provides for integration of receiver and transmitter transformers and a power conduit to the center out taps along with ground. The connector input pins may thereby have access to both receiver and transmitter center out (or cable) taps, both center in (or PHY) taps and ground for the previously unused pins and the inclusion of two augmenting pins.

The embedding of the magnetic transformers into the connector enables the PHY to be disposed from the fore edge of the magnetic integrated connector at 0.985 inch. By combining the transformer and connector, the depth is reduced by 0.969 inch, permitting either a smaller physical board or increased area for component installation, but with the addition of "phantom" power incorporated in the connector.

Figure 8:
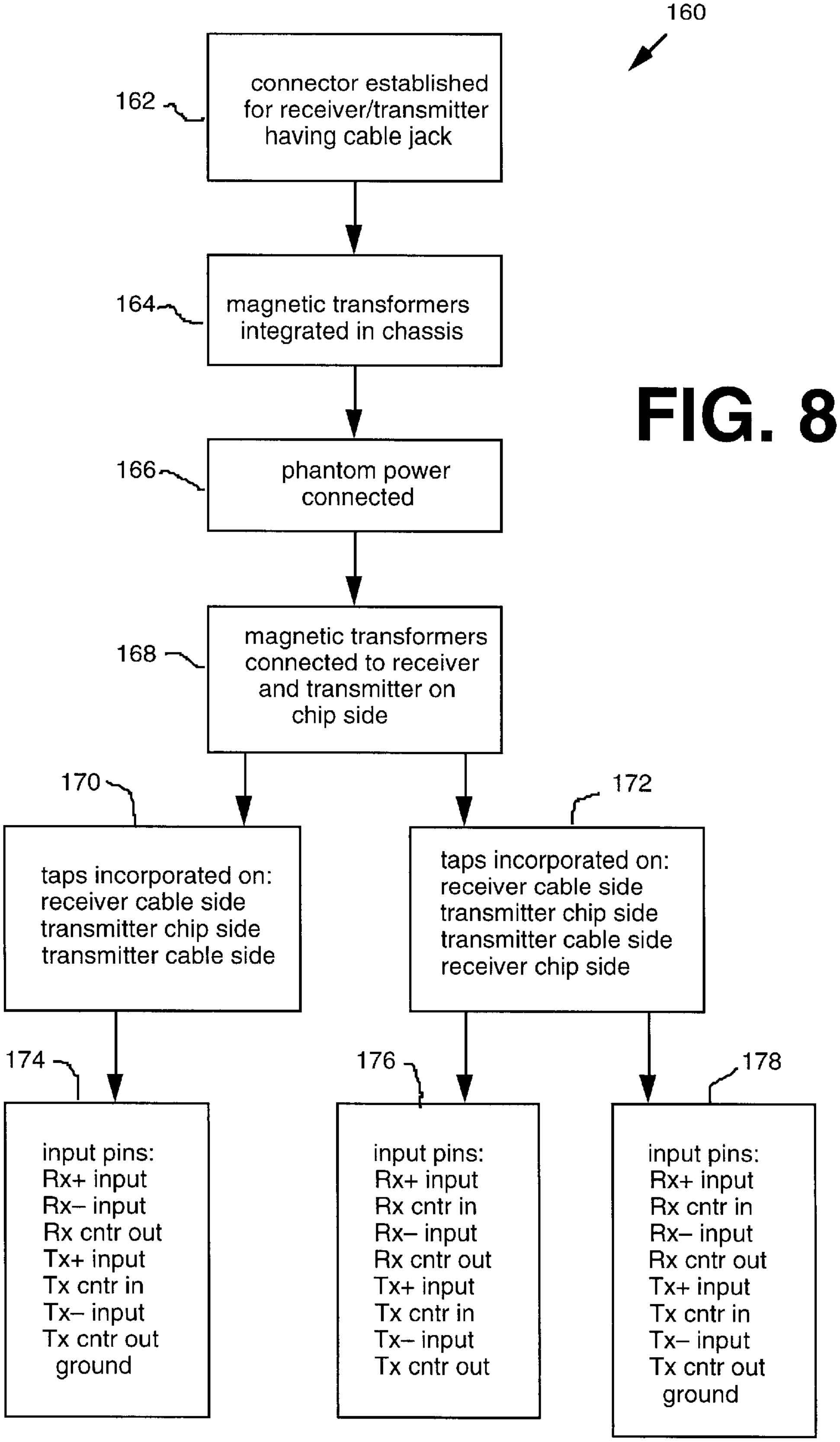
FIG. 8 is a flow diagram of the method for integration of magnetics and "phantom" power in accordance with a specific embodiment of the present invention.

FIG. 8 illustrates a flowchart 160 for integrating the magnetics and the "phantom" power conduit. A connector may be established 162 for communicating with a receiver and transmitter and having an aperture jack for receiving an output cable. Magnetic transformers may be integrated 164 in the chassis, and "phantom" power may be connected 166. The magnetic transformers may be connected 168 to the receiver and transmitter ports on the PHY or chip side.

Taps may be incorporated 170 in a first embodiment on the cable side of the receiver transformer, the chip side of the transmitter transformer and the cable side of the magnetic transformer. Alternatively, a supplemental tap may be incorporated 172 on the chip side of the receiver transformer. In the first embodiment, eight input pins may be connected 174 to a Rx+ input (or chip side), a Rx− input, a Rx center out (or cable side) tap, a Tx+ input, a Tx center in tap, a Tx− input, a Tx center out tap and a ground potential.

In the second embodiment including the supplemental tap, eight input pins may be connected 176 to a Rx+ input, a center in tap, a Rx− input, a Rx center out tap, a Tx+ input, a Tx center in tap, a Tx− input and a Tx center out tap. In the third embodiment including the supplemental tap, ten input pins may be connected 178 to a Rx+ input, a center in tap, a Rx− input, a Rx center out tap, a Tx+ input, a Tx center in tap, a Tx− input, a Tx center out tap and a ground potential.

While embodiments and applications of the invention have been shown and described, it would be apparent to those of ordinary skill in the art having the benefit of this disclosure, that many more modifications than mentioned above are possible without departing from the inventive concepts herein. The invention, therefore, is not to be restricted except in the spirit of the appended claims.

What is claimed is:

1. A connector for receiving and transmitting electronic signals comprising:

a connecting port-within a chassis, said connecting port having a plurality of input connections on a chip side of the connecting port and a plurality of output connections on a cable side of the connecting port, said plurality of input connections connecting to a first receiver port, a second receiver port, a first transmitter port and a second transmitter port;

a transformer within said chassis connecting to said plurality of input connections and said plurality of output connections, said transformer having a winding with a tap on the cable side of the connecting port; and a power connection within said chassis connecting to said tap and to a fixed potential, said power connection being connectable to a remote power source.

2. A connector according to claim 1 wherein said transformer further comprises:

a first magnetic transformer having a winding connecting said first receiver port to said second receiver port; and a second magnetic transformer having a winding connecting said first transmitter port to said second transmitter port.

3. A connector according to claim 2 wherein said transformer further comprises:

a chip side on said first magnetic transformer;

a cable side on said first magnetic transformer;

a chip side on said second magnetic transformer; and a cable side on said second magnetic transformer.

4. A connector according to claim 3, further comprising:

a second tap on said chip side of said second magnetic transformer; and a third tap on said cable side of said second magnetic transformer.

5. A connector according to claim 4, further comprising:

a fourth tap on said chip side of said first magnetic transformer.

6. A connector according to claim 5 wherein said plurality of input connectors further comprises:

a first pin connectable to said first receiver port;

a second pin connectable to said second receiver port;

a third pin connectable to said first tap;

a fourth pin connectable to said first transmitter port;

a fifth pin connectable to said second tap;

a sixth pin connectable to said second transmitter port; and a seventh pin connectable to said third tap.

7. A connector according to claim 6 wherein said plurality of input connectors further comprises:

an eighth pin connectable to said fourth tap.

8. A connector according to claim 7 wherein said fixed potential is said chassis in electrical contact with the connector.

9. A connector according to claim 5 wherein said plurality of input connectors further comprises:

a first pin connectable to said first receiver port;

a second pin connectable to said fourth tap;

a third pin connectable to said second receiver port;

a fourth pin connectable to said first tap;

a fifth pin connectable to said first transmitter port;

a sixth pin connectable to said second tap;

a seventh pin connectable to said second transmitter port;

an eighth pin connectable to said third tap; and a ninth pin connectable to said fixed potential.

10. A connector according to claim 4 wherein said plurality of input connectors further comprises:

a first pin connectable to said first receiver port;

a second pin connectable to said second receiver port;

a third pin connectable to said first tap;

a fourth pin connectable to said first transmitter port;

a fifth pin connectable to said second tap;

a sixth pin connectable to said second transmitter port; and a seventh pin connectable to said third tap.

11. A connector according to claim 10 wherein said plurality of input connectors further comprises:

an eighth pin connectable to said fixed potential.

12. A processing platform for receiving and transmitting electronic signals comprising:

a connector having a chassis, a connecting port within said chassis, a transformer within said chassis, and a power connection, said connecting port having a plurality of input connections on a chip side of the connecting port and a plurality of output connections on a cable side of the connecting port, said plurality of input connections connecting to a first receiver port, a second receiver port, a first transmitter port and a second transmitter port, said transformer connecting to said plurality of input connections and said plurality of output connections, said transformer having a winding with a tap on the cable side of the connecting port, said power connection connecting to said tap and to a fixed potential;

a chip having a chip receiver port and a chip transmitter port, said chip receiver port being connectable to said first receiver port and said second receiver port, said chip transmitter port being connectable to said first transmitter port and said second transmitter port; and a power source connectable to said power connection.

13. A processing platform according to claim 12 wherein said transformer further comprises:

a first magnetic transformer having a winding connecting said first receiver port to said second receiver port; and a second magnetic transformer having a winding connecting said first transmitter port to said second transmitter port.

14. A processing platform according to claim 13 wherein said transformer further comprises:

a chip side on said first magnetic transformer;

a cable side on said first magnetic transformer;

a chip side on said second magnetic transformer; and a cable side on said second magnetic transformer.

15. A processing platform according to claim 14, further comprising:

a second tap on said chip side of said second magnetic transformer; and a third tap on said cable side of said second magnetic transformer.

16. A processing platform according to claim 15, further comprising:

a fourth tap on said chip side of said first magnetic transformer.

17. A processing platform according to claim 16 wherein said plurality of input connectors further comprises:

a first pin connectable to said first receiver port;

a second pin connectable to said second receiver port;

a third pin connectable to said first tap;

a fourth pin connectable to said first transmitter port;

a fifth pin connectable to said second tap;

a sixth pin connectable to said second transmitter port; and a seventh pin connectable to said third tap.

18. A processing platform according to claim 17 wherein said plurality of input connectors further comprises:

an eighth pin connectable to said fourth tap.

19. A processing platform according to claim 18 wherein said fixed potential is said chassis in electrical contact with the connector.

20. A processing platform according to claim 16 wherein said plurality of input connectors further comprises:

a first pin connectable to said first receiver port;

a second pin connectable to said fourth tap;

a third pin connectable to said second receiver port;

a fourth pin connectable to said first tap;

a fifth pin connectable to said first transmitter port;

a sixth pin connectable to said second tap;

a seventh pin connectable to said second transmitter port;

an eighth pin connectable to said third tap; and a ninth pin connectable to said fixed potential.

21. A processing platform according to claim 15 wherein said plurality of input connectors further comprises:

a first pin connectable to said first receiver port;

a second pin connectable to said second receiver port;

a third pin connectable to said first tap;

a fourth pin connectable to said first transmitter port;

a fifth pin connectable to said second tap;

a sixth pin connectable to said second transmitter port; and a seventh pin connectable to said third tap.

22. A processing platform according to claim 21 wherein said plurality of input connectors further comprises:

an eighth pin connectable to said fixed potential.

23. A method for receiving and transmitting electronic signals comprising:

establishing into a chassis a connecting port having a plurality of input connections on a chip side of the connecting port to a receiver port and a transmitter port and a plurality of output pins on a cable side of the connecting port;

integrating into said chassis a transformer between said plurality of input connections and said plurality of output pins, said transformer having a winding with a tap on the cable side of the connecting port; and connecting into said chassis a power conduit to said tap and to a fixed potential, said power conduit being connectable to a remote power source.

24. A method according to claim 23 wherein said integrating a transformer further comprises:

connecting a winding of a first magnetic transformer to said first receiver port and said second receiver port; and connecting a winding of a second magnetic transformer to said first transmitter port and said second transmitter port.

25. A method according to claim 24, further comprising:

incorporating a second tap on a chip side of said second magnetic transformer; and incorporating a third tap on a cable side of said second magnetic transformer.

26. A method according to claim 25, further comprising:

incorporating a fourth tap on a chip side of said first magnetic transformer.

27. A method according to claim 26 wherein said establishing a connecting port further comprises:

connecting a first pin of said plurality of input connectors to said first receiver port;

connecting a second pin of said plurality of input connectors to said second receiver port;

connecting a third pin of said plurality of input connectors to said first tap;

connecting a fourth pin of said plurality of input connectors to said first transmitter port;

connecting a fifth pin of said plurality of input connectors to said second tap;

connecting a sixth pin of said plurality of input connectors to said second transmitter port; and connecting a seventh pin of said plurality of input connectors to said third tap.

28. A method according to claim 27 wherein said establishing a connecting port further comprises:

connecting an eighth pin of said plurality of input connectors to said fourth tap.

29. A method according to claim 28 further including connecting said fixed potential to said chassis in electrical contact with the connector.

30. A method according to claim 26 wherein said establishing a connecting port further comprises:

connecting a first pin of said plurality of input connectors to said first receiver port;

connecting a second pin of said plurality of input connectors to said fourth tap;

connecting a third pin of said plurality of input connectors to said second receiver port;

connecting a fourth pin of said plurality of input connectors to said first tap;

connecting a fifth pin of said plurality of input connectors to said first transmitter port;

connecting a sixth pin of said plurality of input connectors to said second tap;

connecting a seventh pin of said plurality of input connectors to said second transmitter port;

connecting an:eighth pin of said plurality of input connectors to said third tap; and connecting a ninth pin of said plurality of input connectors to said fixed potential.

31. A method according to claim 25 wherein said establishing a connecting port further comprises:

connecting a first pin of said plurality of input connectors to said first receiver port;

connecting a second pin of said plurality of input connectors to said second receiver port;

connecting a third pin of said plurality of input connectors to said first tap;

connecting a fourth pin of said plurality of input connectors to said first transmitter port;

connecting a fifth pin of said plurality of input connectors to said second tap;

connecting a sixth pin of said plurality of input connectors to said second transmitter port; and connecting a seventh of said plurality of input connectors pin to said third tap.

32. A method according to claim 31 wherein said establishing a connecting port further comprises:

connecting an eighth pin of said plurality of input connectors to said fixed potential.

33. An apparatus for receiving and transmitting electronic signals comprising:

means for establishing into a chassis a connecting port having a plurality of input connections on a chip side of the connecting port to a receiver port and a transmitter port and a plurality of output pins on a cable side of the connecting port;

means for integrating into said chassis a transformer between said plurality of input connections and said plurality of output pins, said transformer having a winding with a tap on the cable side of the connecting port; and means for connecting into said chassis a power conduit to said tap and to a fixed potential, said power conduit being connectable to a remote power source.

34. An apparatus according to claim 33 wherein said means for integrating a transformer further comprises:

means for connecting a winding of a first magnetic transformer to said first receiver port and said second receiver port; and means for connecting a winding of a second magnetic transformer to said first transmitter port and said second transmitter port.

35. An apparatus according to claim 34, further comprising:

means for incorporating a second tap on a chip side of said second magnetic transformer; and means for incorporating a third tap on a cable side of said second magnetic transformer.

36. An apparatus according to claim 35, further comprising:

means for incorporating a fourth tap on a chip side of said first magnetic transformner.

37. An apparatus according to claim 36 wherein said means for establishing a connecting port further comprises:

means for connecting a first pin of said plurality of input connectors to said first receiver port;

means for connecting a second pin of said plurality of input connectors to said second receiver port;

means for connecting a third pin of said plurality of input connectors to said first tap;

means for connecting a fourth pin of said plurality of input connectors to said first transmitter port;

means for connecting a fifth pin of said plurality of input connectors to said second tap;

means for connecting a sixth pin of said plurality of input connectors to said second transmitter port; and means for connecting a seventh pin of said plurality of input connectors to said third tap.

38. An apparatus according to claim 37 wherein said means for establishing a connecting port further comprises:

means for connecting an eighth pin of said plurality of input connectors to said fourth tap.

39. An apparatus according to claim 38 further including means for connecting said fixed potential to said chassis in electrical contact with the connector.

40. An apparatus according to claim 36 wherein said means for establishing a connecting port further comprises:

means for connecting a first pin of said plurality of input connectors to said first receiver port;

means for connecting a second pin of said plurality of input connectors to said fourth tap;

means for connecting a third pin of said plurality of input connectors to said second receiver port;

means for connecting a fourth pin of said plurality of input connectors to said first tap;

means for connecting a fifth pin of said plurality of input connectors to said first transmitter port;

means for connecting a sixth pin of said plurality of input connectors to said second tap;

means for connecting a seventh pin of said plurality of input connectors to said second transmitter port;

means for connecting an eighth pin of said plurality of input connectors to said third tap; and means for connecting a ninth pin of said plurality of input connectors to said fixed potential.

41. An apparatus according to claim 35 wherein said means for establishing a connecting port further comprises:

means for connecting a first pin of said plurality of input connectors to said first receiver port;

means for connecting a second pin of said plurality of input connectors to said second receiver port;

means for connecting a third pin of said plurality of input connectors to said first tap;

means for connecting a fourth pin of said plurality of input connectors to said first transmitter port;

means for connecting a fifth pin of said plurality of input connectors to said second tap;

means for connecting a sixth pin of said plurality of input connectors to said second transmitter port; and means for connecting a seventh of said plurality of input connectors pin to said third tap.

42. An apparatus according to claim 41 wherein said means for establishing a connecting port further comprises:

means for connecting an eighth pin of said plurality of input connectors to said fixed potential.

* * * * *

UNITED STATES PATENT AND TRADEMARK OFFICE

CERTIFICATE OF CORRECTION

PATENT NO. : 6,541,878 B1
DATED : April 1, 2003
INVENTOR(S) : Wael W. Diab

It is certified that error appears in the above-identified patent and that said Letters Patent is hereby corrected as shown below:

Column 4,
Line 66, replace "conductor" with -- connector --.

Column 5,
Line 13, delete the whole paragraph which begins with "The embedding" and ends with "need in the industry.".
Line 37, delete "is".

Column 7,
Line 21, replace "eight-present" with -- eight-pin embodiment of the present --.

Column 10,
Line 33, replace "port-within" with -- port within --.

Column 15,
Line 4, replace "transformner." with -- transformer --.

Signed and Sealed this

Ninth Day of September, 2003

JAMES E. ROGAN
*Director of the United States Patent and Trademark Office*